United States Patent [19]

Vansickle et al.

[11] 4,334,817
[45] Jun. 15, 1982

[54] BACK LOADER FOR BIG HAY BALES

[76] Inventors: Julius D. Vansickle; Major J. Vansickle, both of Rte. 3, Boswell, Okla. 74727

[21] Appl. No.: 215,561

[22] Filed: Dec. 11, 1980

Related U.S. Application Data

[63] Continuation of Ser. No. 961,134, Nov. 16, 1978, abandoned.

[51] Int. Cl.³ .............................................. A01D 87/12
[52] U.S. Cl. ..................................... 414/24.5; 294/88; 414/703; 414/739; 414/911
[58] Field of Search ...................... 414/24.5, 24.6, 703, 414/704, 729, 739, 911; 294/88, 104; 242/86.5 R

[56] References Cited

U.S. PATENT DOCUMENTS

| | | | |
|---|---|---|---|
| 3,587,218 | 6/1971 | Geary | 414/739 |
| 3,677,428 | 7/1972 | Mallett | 414/739 |
| 3,908,846 | 9/1975 | Brummitt | 414/739 |
| 3,946,887 | 3/1976 | Parker | 414/739 X |
| 4,049,140 | 9/1977 | Roose | 414/24.6 |
| 4,194,863 | 3/1980 | Vansickle et al. | 414/24.5 |

FOREIGN PATENT DOCUMENTS 879496  10/1961  United Kingdom ................ 414/739

Primary Examiner—Leslie J. Paperner
Attorney, Agent, or Firm—Head & Johnson

[57] ABSTRACT

Loading apparatus for use with a tractor having a three-point hitch including an upper stationary pivot point and a pair of opposed generally paralleled lifting arms below the pivot point, including a horizontal lifting bar supported by the outer end of the tractor lifting arms, a pair of wing members having the inner end pivotally secured to the tractor pivot point and the outer ends configured so that they are generally parallel and spaced apart sufficient to engage the ends of a cylindrical hay bale, and a hydraulic grasping cylinder piston between the wing members controllable so as to move the wing members together to grasp a hay bale after which the tractor lifting arms may be actuated to lift the lifting bar and thereby the wing members to lift the hay bale for transportation.

1 Claim, 5 Drawing Figures

BACK LOADER FOR BIG HAY BALES

This is a continuation application of Ser. No. 961,134, filed Nov. 16, 1978, now abandoned.

BACKGROUND AND OBJECTS OF THE INVENTION

In recent years the use of large hay bales has become more common. These hay bales are so large and bulky that they must be lifted and transported only by mechanical means, and for this purpose apparatus has been devised to assist the farmer in lifting and transporting large bales of hay. Reference may be had to copending Application Ser. No. 927,837, filed July 25, 1978, now U.S. Pat. No. 4,194,863, entitled "BIG BALE LOADER" for an example of a type of loading apparatus for lifting and transporting hay bales. The type apparatus disclosed in the pending application is particularly adapted for mounting on the front of a vehicle, such as a tractor.

The present invention is directed towards a type of loader for big hay bales which is particularly adapted for mounting on the rear of tractors having a three-point hookup. Most small and intermediate size farm tractors in use in the United States today have what is termed a three-point hookup. This consists of an upper stationary pivot point and a pair of hydraulically controlled lifting arms which are positioned below the pivot point. The lifting arms are pivoted about a common axis and are hydraulically controlled so that the arms are raised simultaneously up and down utilizing hydraulic energy supplied by a pump driven by the tractor engine. Control mechanisms are mounted on the tractor. This typical type of three-point hydraulically controlled hookup is popular because it allows the tractor operator to attach a great variety of agricultural implements to the tractor and affords means of controlling the implements. It is particularly useful with implements such as plows, mowers, discs, and so forth which can be lifted off the ground for transportation to and from work areas.

It is therefore an object of this invention to provide an improved loader for large hay bales particularly adaptable for the attachment to the rear end of a tractor.

More particularly, an object of this invention is to provide a big bale loader for the rear end of tractor having a three-point hookup wherein the hydraulic system for lifting large bales of hay primarily utilizes controls already existing on tractors having three-point hookups and wherein the only auxiliary hydraulic control required is the provision of a grasping cylinder-piston for engaging or disengaging the lifting apparatus with large bales of hay.

These general objects as well as other and more specific objects of the invention will be fulfilled in the following description and claims taken in conjunction with the attached drawings.

DESCRIPTION OF THE VIEWS

SUMMARY OF THE INVENTION

An apparatus is provided for use with a tractor for lifting and transporting large cylindrical hay bales. The apparatus is particularly useful to attach to the rear end of a tractor having a typical three-point hookup which includes an upper stationary pivot point and a pair of opposed, generally parallel hydraulically actuated lifting arms which pivot about a common axis. The tractor lifting arms are simultaneously pivoted in paralleled vertical planes by hydraulic action of the tractor mechanism. The invention, which is attached to the tractor three-point hookup, includes a horizontal lifting bar supported by the outer ends of the tractor arms, the lifting bar is thereby vertically positionable by the tractor lifting arms. A pair of wing members is provided. Each of the wing members has an outer end and an inner end portion. The inner end of the inner portions of each wing member are pivotally attached to the tractor pivot point and are thereby pivotable horizontally and vertically relative to the pivot point. Each of the wing members has the outer portion connected to the inner portion at an obtuse angle so that the outer portions of the wing members extend generally parallel to each other but are movable towards and away from each other. The wing members are supported on the lifting bar and thus the vertical position of the lifting bar determines the vertical position of the wing members. Connected between the wing members at a place intermediate the ends of each is a grasping cylinder-piston. By hydraulic actuation of the cylinder-piston the wing member outer ends may be spaced apart from each other to be positioned on either side of a large bale of hay and subsequently moved towards each other to grasp the large bale of hay, after which the wing members may be elevated by the elevation of the lifting bar to lift the large bale of hay for transportation.

DETAILED DESCRIPTION

Figure 1:
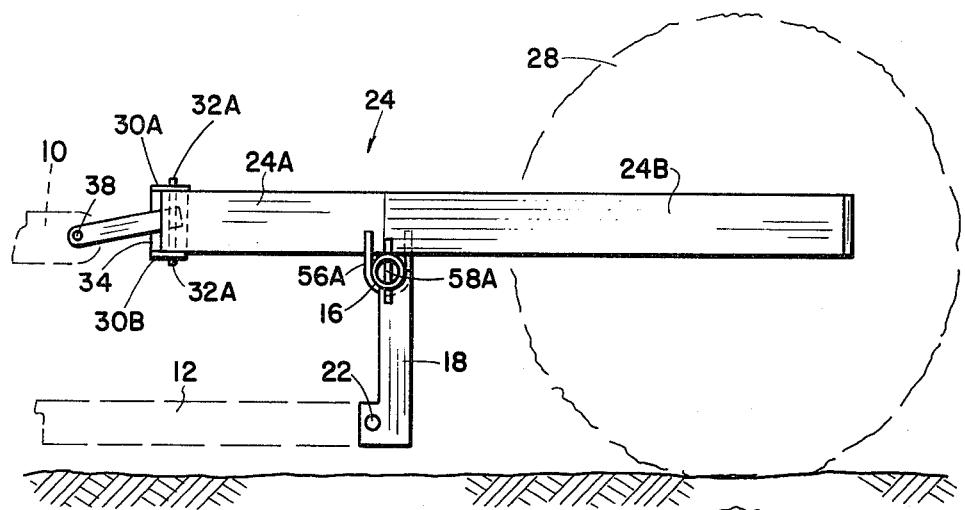
FIG. 1 is an elevational side view showing the back loader for big hay bales as attached to a tractor having a three-point hookup, portions of a tractor and a bale of hay being shown in dotted outline.
Figure 3:
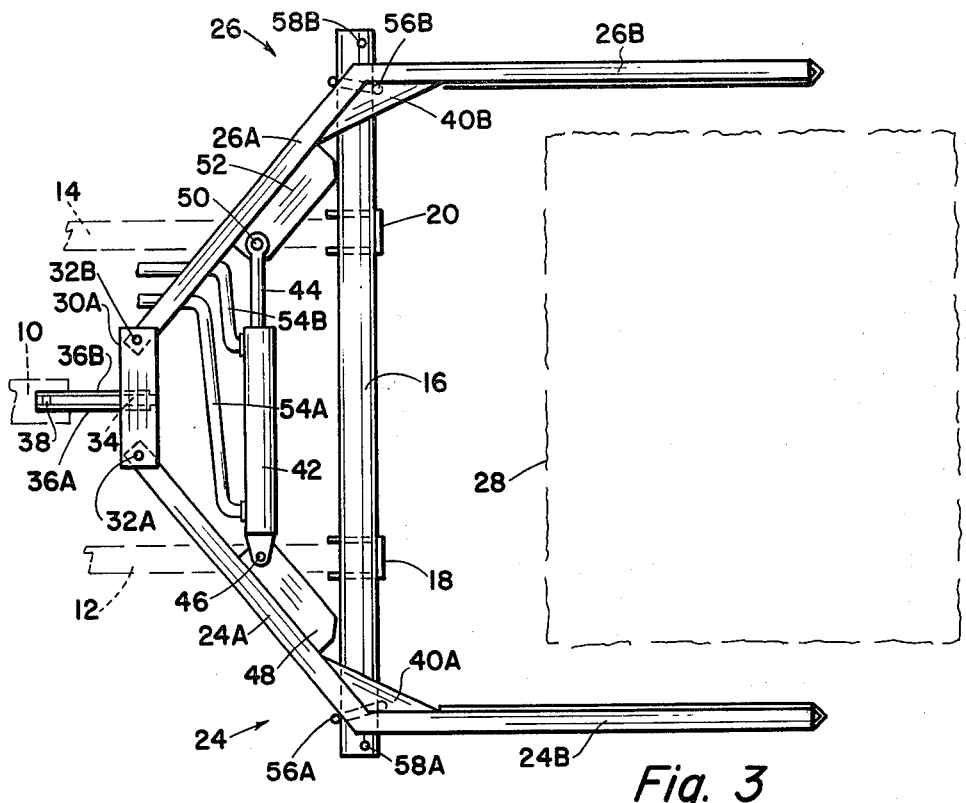
FIG. 3 is a plan view looking down on a back loader for big hay bales according to this invention and showing the apparatus as positioned preparatory to engaging a large bale of hay.

Referring now to the drawings and first to FIGS. 1 and 3, an apparatus which embodies the principles of this invention is illustrated. The apparatus is for use with a tractor, the tractor being of the type having a commonly employed three-point hookup. Such three-point hookup includes a stationary pivot point 10 and a pair of hydraulically actuated lifting arms 12 and 14 shown in dotted outline.

The lifting arms 12 and 14 are generally parallel to each other and are actuated about a common axis at their inner ends (not shown) so that the lifting arms move up and down in unison by mechanisms controllable from the tractor (not shown). The use of a three-point hookup is well known, as most agricultural tractors, particularly those of small and medium sizes sold in the United States at this time are typically supplied by a three-point hookup, including hydraulic controls for elevationally positioning the lifting arms 12 and 14.

The first element of the loader for big hay bales is a horizontal lifting bar 16. The bar is shown to be cylindrical although it, of course, may be of any cross-sectional configuration. Affixed to the lifting bar 16 is a pair of paralleled support members 18 and 20. The upper end of the support member 18 is connected to lifting bar 16, such as by being welded to it, and the lower end is pivotally connected about pin 22 to the outer end of lifting arm 12. In like manner, the upper end of support member 20 is connected to the lifting bar 16 and the lower end pivoted to the outer end of tractor lifting arm 14.

A first wing member is generally indicated by the numeral 24 and a second wing member is generally indicated by the numeral 26. These wing members are utilized for grasping a bale of hay 28. Wing member 24 includes an inner portion 24A and an outer portion 24B and in like manner, the second wing member 26 includes inner portion 26A and outer portion 26B. The inner and outer portions of each of the wing members are joined at an obtuse angle. The inner end of inner portion 24A and the inner end of inner portion 26A are each pivotally connected to tractor pivot point 26. In the illustrated manner of achieving this pivotal connection, an upper horizontal member 30A and a lower horizontal member 30B are employed. The members 30A and 30B are parallel to each other, spaced apart a distance so as to receive the inner ends of the wing members 24 and 26. The wing members are pivotal in a horizontal plane between the upper and lower horizontal members 30A and 30B by means of pivot pins 32A and 32B. The horizontal members 30A and 30B are supported together by a central vertical plate 34. A pair of bracket members 36A and 36B are attached to either side of plate 34 and extend rearwardly and are pivotally connected to the tractor pivot post 10 by means of a pin 38. The combination of the upper and lower horizontal members 30A and 30B, vertical plate 34, and bracket members 36A and 36B provide a means of pivotally connecting the inner ends of wing member 24, 26 to the tractor pivot point 10 in such a way that the wing members are pivotal vertically as well as pivotal towards and away from each other. The wing members nevertheless remain in a common plane at all times as they each rest upon the lifting bar 16.

As previously stated, the wing member inner portions and outer portions are connected together at an obtuse angle and gusset plates 40A and 40B ensure that the wings are sufficiently stiff to resist bending as force is applied for grasping a large hay bale 28.

Positioned between wing members 24 and 26 is a hydraulic grasping cylinder 42 having a piston 44 reciprocally extending therefrom. Cylinder 42 is pivotally connected by pin 46 to a plate 48 welded to wing member inner portion 24A. In like manner, piston rod 44 is pivotally connected by pin 50 to a plate 52 welded to wing member inner portion 26A. Hydraulic hoses 54A and B extend from cylinder 42 and connect to a source of hydraulic fluid pressure and control (not shown), which is the part of the tractor to which the bale loading device is attached.

OPERATION

Figure 5:
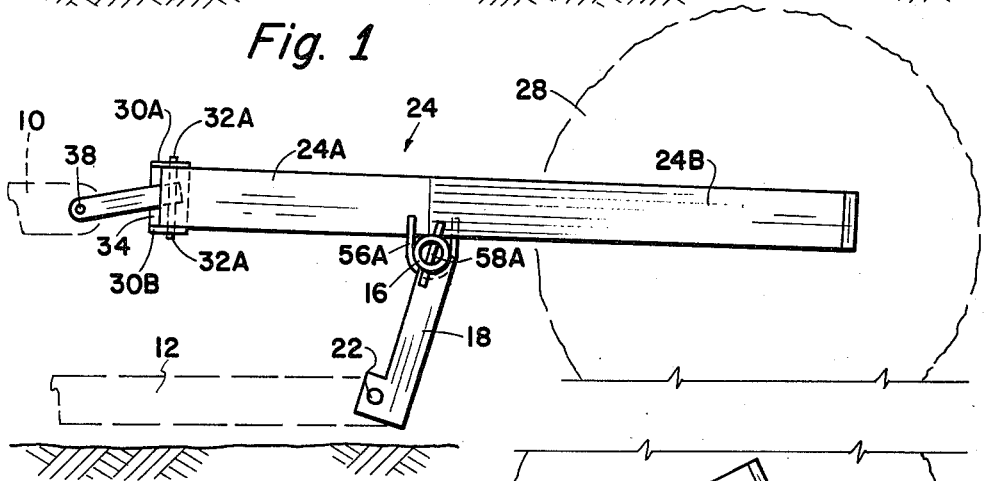
FIG. 5 is an elevational view as shown in FIGS. 1 and 2, and showing the position of the loader after a bale of hay has been grasped but before it is lifted off the ground.
Figure 4:
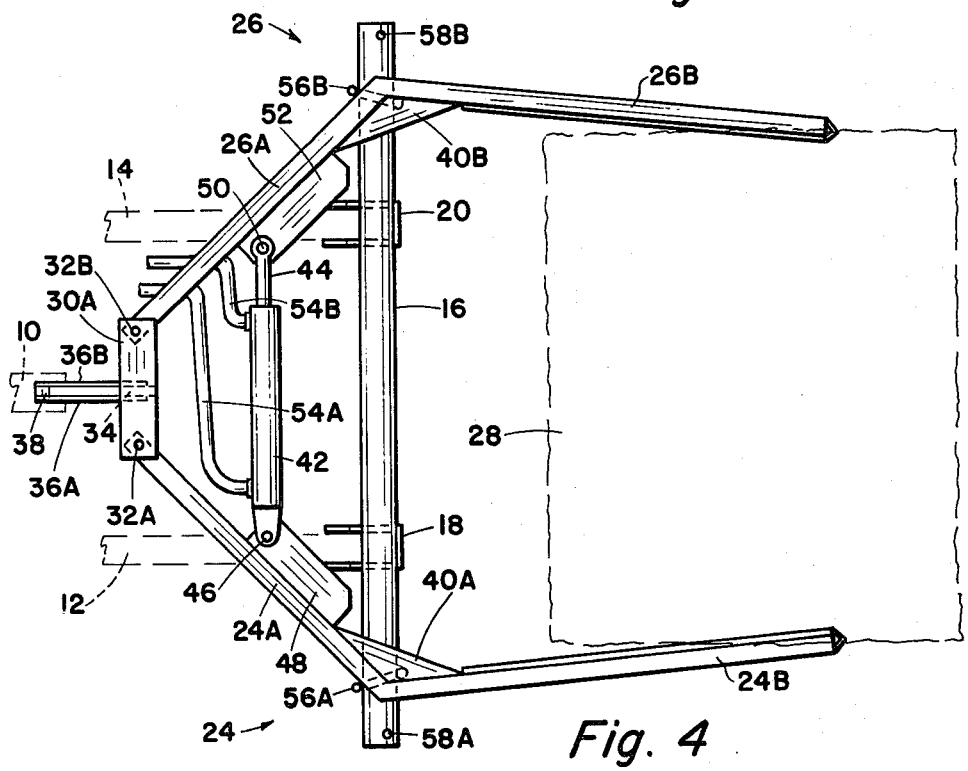
FIG. 4 is a plan view as shown in FIG. 3 showing the apparatus actuated to engage a large bale of hay for lifting and transportation of the bale.

When the loader is to be used to lift for transportating a large bale of hay 28, cylinder 42 is applied with hydraulic pressure to extend piston rod 44, sliding the wing members 24A and 24B apart from each other so that the outer ends 24B and 26B extend substantially parallel to each other as illustrated in FIG. 3. The outer ends of the wings are thereby spaced apart a distance greater than the length of hay bale 28 and the tractor may be backed into position so that the wing member outer ends 24B and 26B extend to either side of the ends of hay bale 28. The operator then applies hydraulic pressure to cylinder 42 to withdraw piston 44, moving the wing members 24 and 26 towards each other so that the outer ends 24B, 26B engage the bale of hay as shown in FIGS. 4 and 5. As long as this hydraulic force is applied, the bale of hay 28 is securely grasped by the wing members.

Figure 2:
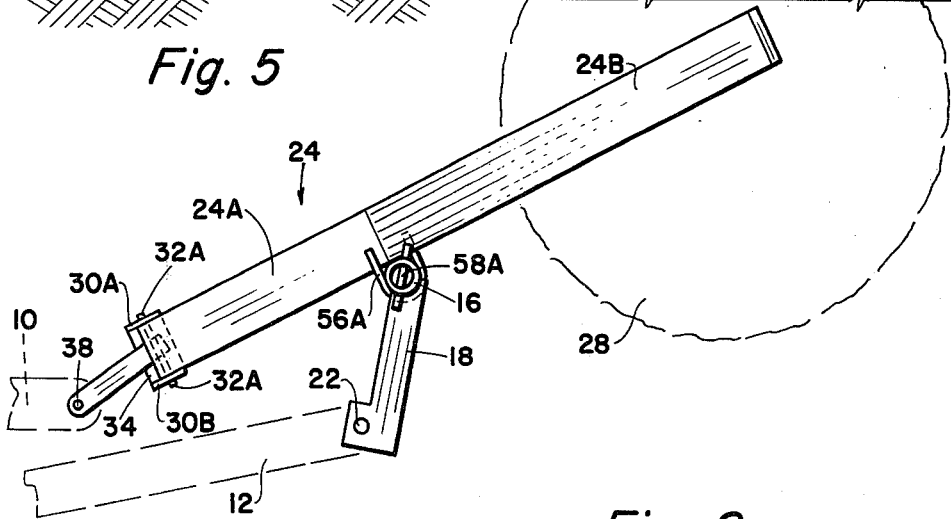
FIG. 2 is an elevational side view as shown in FIG. 1 and showing the loader operated so as to lift a large bale of hay for transportation.

Next, the driver may lift the bale of hay 28 by actuating controls on the tractor (not shown) to pivot the lifting arms 12 and 14 upwardly. This upward pivotation of the lifting arms elevates lifting bar 16 and thereby wing members 24 and 26, to the position shown in FIG. 2. In such condition, the bale of hay may be moved about by the tractor. The bale of hay may be lowered to the ground by lowering the lifting arms 12 and 14 and thereafter actuating cylinder 42 to spread the wing members apart.

To retain the wing members 24 and 26 in proper engagement with the lifting bar 16, U-Bolts 56A and 56B are employed, each U-bolt encompassing the lifting bar 16 and the ends thereof being welded to the wing members. The internal dimensions of the U-bolts 56A and 56B are such that the wing members are freely slidable on the lifting bar 16. To make certain that the wing members 24 and 26 remain supported on top of lifting bar 16, the outer travel may be limited by pins 58A and 56B inserted in the outer ends of the lifting bar.

An important advantage of the hay loader of this invention is that it enables the operator to lift a large bale of hay to an elevation of four feet or more on most tractors. The operator can use the loader to load large hay bales onto hay trailers or trucks, including pickup trucks, for transportation of the hay bales. In like manner, the loader may be used to lift large hay bales off trailers or trucks if they are not self-unloading. Thus, the loader may be used to lift a large hay bale and move it while lifted from one location to another, or use it to load the lifted bale onto another conveyance for transportation.

When the wing members are spread apart for releasing engagement with a hay bale, the wings are spaced ready to receive the next bale, so wasted motion is eliminated.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range or equivalency to which each element thereof is entitled.

What is claimed is:

1. Apparatus for use with a tractor for lifting and transporting objects such as large cylindrical hay bales, the tractor having a three-point hitch including a stationary pivot point and a pair of opposed, generally paralleled lifting arms below the pivot point, the lifting arms being simultaneously pivotal in paralleled vertical planes by hydraulic action, the apparatus comprising:
(1) a horizontal lifting bar;

(2) means of supporting said horizontal lifting bar to the lifting arms of a tractor, the lifting bar being thereby vertically positionable by the tractor arms;

(3) a short horizontal member having the inner end pivotally attached to the tractor pivot point;

(4) a first wing member having an inner portion and an outer portion;

(5) a second wing member having an inner portion and an outer portion, the inner end of each wing member being pivotally attached to said horizontal member whereby the wing members are free to pivot towards and away from each other, the wing members slidably resting on said lifting bar intermediate their ends;

(6) a hydraulic grasping cylinder-piston pivotally connected at opposite ends to the wing members wherein the outer ends of the wing members may be spaced apart from each other to receive an object therebetween and in which condition the tractor lifting arms may be pivoted upwardly to lift said lifting bar and thereby said wing members to lift the grasped object; and (7) means affixed to each said wing member slidably receiving said lifting bar through the full pivotal displacement of said wing members.

* * * * *